United States Patent
Khoshnevisan et al.

(10) Patent No.: US 12,408,173 B2
(45) Date of Patent: Sep. 2, 2025

(54) UPLINK CONTROL INFORMATION MULTIPLEXING

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Jing Sun, San Diego, CA (US); Tao Luo, San Diego, CA (US); Yan Zhou, San Diego, CA (US); Fang Yuan, Beijing (CN); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 17/912,374

(22) PCT Filed: May 9, 2020

(86) PCT No.: PCT/CN2020/089345
§ 371 (c)(1),
(2) Date: Sep. 16, 2022

(87) PCT Pub. No.: WO2021/226740
PCT Pub. Date: Nov. 18, 2021

(65) Prior Publication Data
US 2023/0138449 A1 May 4, 2023

(51) Int. Cl.
*H04W 72/21* (2023.01)
*H04W 72/232* (2023.01)
*H04W 72/044* (2023.01)

(52) U.S. Cl.
CPC ......... *H04W 72/21* (2023.01); *H04W 72/232* (2023.01); *H04W 72/046* (2013.01)

(58) Field of Classification Search
CPC . H04W 72/21; H04W 72/232; H04W 72/046; H04L 1/08; H04L 5/0044; H04L 5/0053; H04L 5/0023; H04B 7/0695
See application file for complete search history.

(56) References Cited

U.S. PATENT DOCUMENTS 12,047,955 B2 * 7/2024 Huang ................. H04L 1/1671
2018/0139014 A1 * 5/2018 Xiong ............... H04W 72/0453
(Continued)

FOREIGN PATENT DOCUMENTS

CN 107409021 A 11/2017
CN 110149726 A 8/2019
(Continued)

OTHER PUBLICATIONS

International Search Report and Written Opinion—PCT/CN2020/089345—ISA/EPO—Jan. 27, 2021.
(Continued)

*Primary Examiner* — Afshawn M Towfighi
(74) *Attorney, Agent, or Firm* — ArentFox Schiff LLP

(57) ABSTRACT

Determining, by a user equipment (UE) of a wireless communication system, that a physical uplink control channel (PUCCH) transmission of the UE carrying uplink control information (UCI) will collide upon transmission with another physical uplink shared channel (PUSCH) transmission of the UE. The UE then multiplexes, in response to the determining, the UCI on the PUSCH transmission based on one or more of the beam of the PUCCH transmission and the beam of the particular PUSCH transmission.

14 Claims, 15 Drawing Sheets

(56) References Cited

U.S. PATENT DOCUMENTS

| | | | |
|---|---|---|---|
| 2018/0167932 A1* | 6/2018 | Papasakellariou | H04L 1/1812 |
| 2019/0230683 A1 | 7/2019 | Akkarakaran et al. | |
| 2019/0364561 A1* | 11/2019 | Xiong | H04W 76/27 |
| 2020/0037314 A1* | 1/2020 | Xiong | H04L 1/1812 |
| 2021/0105126 A1* | 4/2021 | Yi | H04L 1/1671 |
| 2024/0357633 A1* | 10/2024 | Takahashi | H04W 72/12 |

FOREIGN PATENT DOCUMENTS

| | | |
|---|---|---|
| CN | 110999450 A | 4/2020 |
| CN | 110999451 A | 4/2020 |
| WO | 2021155502 A1 | 8/2021 |

OTHER PUBLICATIONS

Oppo: "PUSCH Enhancement for URLLC", 3GPP Draft, 3GPP TSG RAN WG1 #99, R1-1912520, Reno, USA, Nov. 18-22, 2019, 8 pages, Section 2.
Vivo: "Remaining Issues on UCI Multiplexing for eMBB", 3GPP TSG RAN WG1 Meeting #93, R1-1806063, Busan, Korea, May 21-25, 2018, 5 pages, Section 3.
Supplementary European Search Report—EP20935054—Search Authority—The Hague—Apr. 16, 2024.
Supplementary Partial European Search Report—EP20935054—Search Authority—The Hague—Jan. 22, 2024.

* cited by examiner

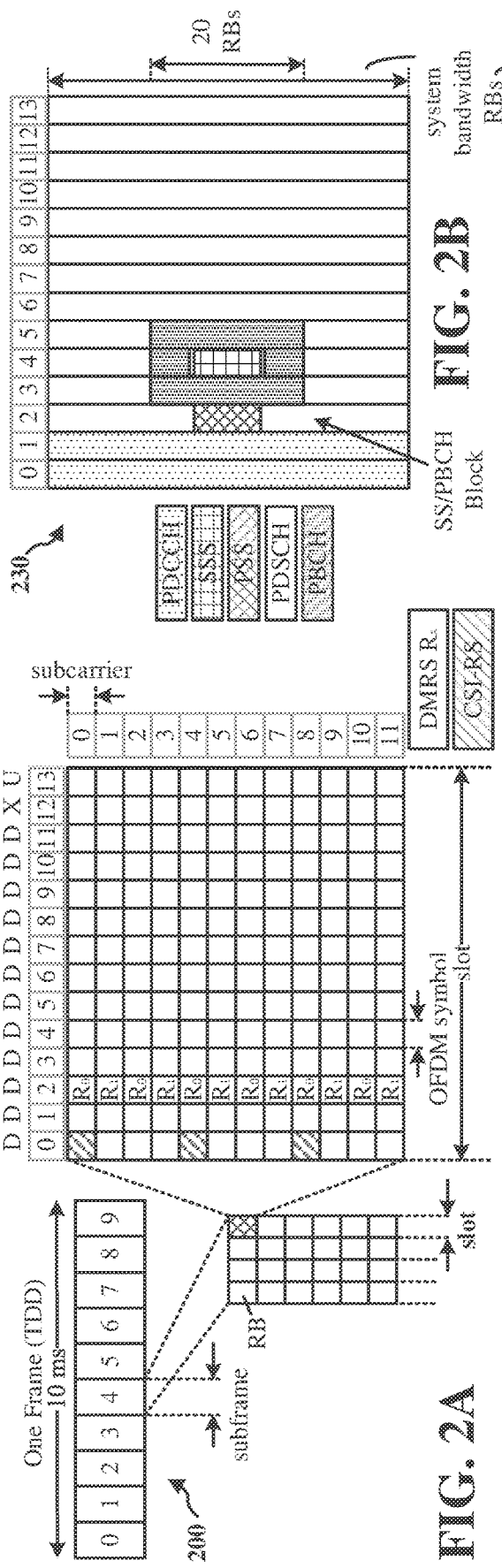
FIG. 2A
FIG. 2B
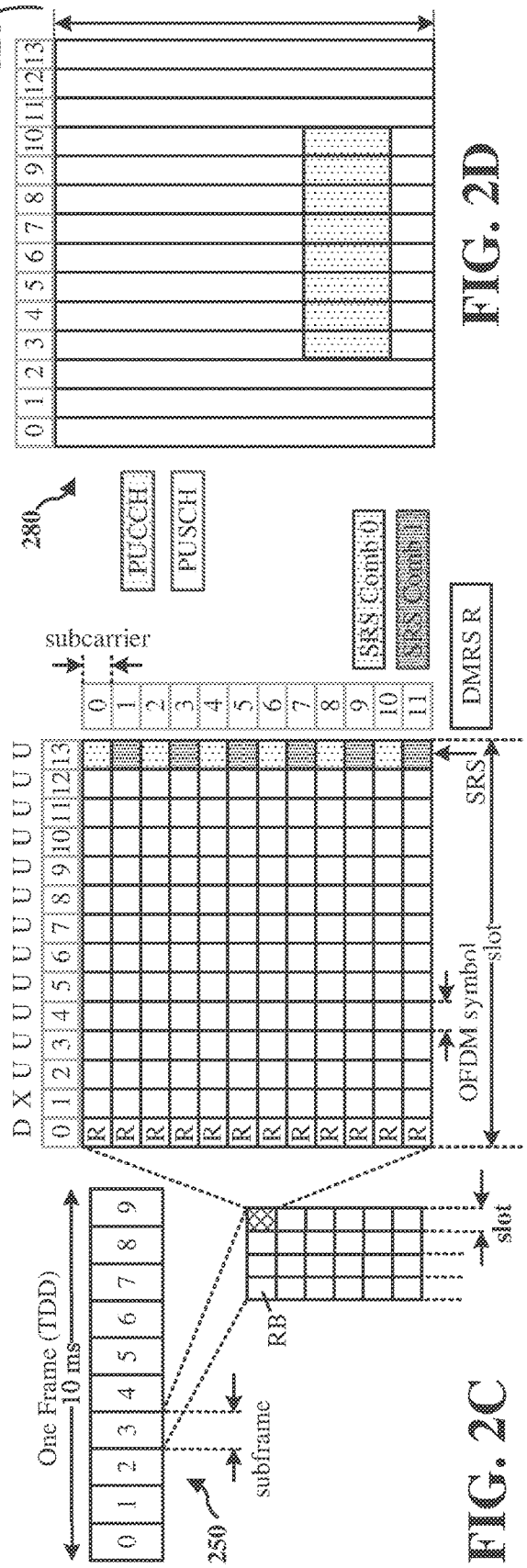
FIG. 2C
FIG. 2D

UPLINK CONTROL INFORMATION MULTIPLEXING

CROSS-REFERENCE TO RELATED APPLICATIONS

This application is a 35 U.S.C. § 371 National Phase Application of PCT Application No. PCT/CN2020/089345 filed May 9, 2020, entitled "UPLINK CONTROL INFORMATION MULTIPLEXING," which is assigned to the assignee hereof and expressly incorporated by reference herein for all purposes.

BACKGROUND

Technical Field

The present disclosure relates generally to communication systems, and more particularly in some examples, to multiplex uplink control information (UCI) onto various uplink physical channels to avoid collision between the uplink physical channels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In aspects of the present disclosure, methods, non-transitory computer readable media, and apparatuses are provided to determine, by a UE of a wireless communication system, that a PUCCH transmission of the UE carrying UCI will collide upon transmission with a particular PUSCH transmission of the UE. The UE then multiplexes, in response to the determining, the UCI on the particular PUSCH transmission based on the beam of the PUCCH transmission and the beam of the particular PUSCH transmission.

In some examples of the technology disclosed herein, the UE is operative to transmit both PUCCH and PUSCH in repeated transmissions across a plurality of beams. In such examples, the UE receives downlink control information (DCI) specifying beam-dependent rules for multiplexing UCI onto specific instances of repeated PUSCH transmissions. In such examples, multiplexing includes multiplexing the UCI onto a specific instance of the repeated PUSCH transmission based on the beam-dependent rules. In some such examples, the beam-dependent rules specify multiplexing UCI from only a PUCCH repetition that overlaps at least one PUSCH repetition.

In some examples of the technology disclosed herein, the UE is operative to transmit both PUCCH and PUSCH in repeated transmissions across a plurality of beams. In such examples, multiplexing includes multiplexing the UCI of the PUCCH transmission on a repetition of the particular PUSCH transmission having a beam in common with the PUCCH transmission. In some such examples. the repetition of the particular PUSCH transmission having a beam in common with the PUCCH transmission is the earliest instance of the particular PUSCH transmission having a beam in common with the PUCCH transmission.

In some examples of the technology disclosed herein, the UE is operative to transmit at a given time on any one of a first group of physical channels including a first PUCCH and a first PUSCH on a first beam, and to transmit at the given time on any one of a second group of physical channels including a second PUCCH and a second PUSCH on a second beam. In such examples, determining includes determining, independently for each particular beam of the first beam and the second beam, that a PUCCH transmission carrying UCI on the particular beam will collide upon transmission with a PUSCH transmission of the UE on the particular beam. In such examples, multiplexing includes multiplexing, independently for each particular beam in response to the corresponding determining, the UCI of the PUCCH of the particular beam on the PUSCH for the particular beam.

In some such examples, the first PUSCH and the second PUSCH are not set for transmission fully overlapping in time. In such examples, after multiplexing, the UE can either (one of): drop transmission of one of the first PUSCH and the second PUSCH based on a priority, the priority based on one of a content of each PUSCH and a group identifier of each PUSCH; align the first PUSCH and the second PUSCH and transmitting both the first PUSCH and the second PUSCH; or multiplex the UCI of the first PUCCH and the UCI of the second PUCCH onto one of the first PUSCH or the second PUSCH, and transmitting the PUSCH carrying the multiplexed UCIs, under the condition that neither PUSCH includes either uplink shared channel data or channel state information. In some such examples, aligning includes one of: aligning based on the earlies first symbol and the last latest symbol of transmission across the first beam and the second beam; and aligning based on the latest first symbol and the earliest last symbol.

In some examples, the technology operates in a wireless communication system including a UE operative to transmit both PUCCH and PUSCH in repeated transmissions across a plurality of beams to a base station of the system. In such examples, the base station specifies, in downlink control information (DCI) to the UE, beam-dependent rules for multiplexing UCI of a PUCCH transmission repetition onto a PUSCH transmission repetition upon the UE determining that a PUCCH transmission repetition carrying the UCI will collide upon transmission with a PUSCH transmission repetition. In such examples, the base station receives, after the specifying, the PUSCH transmission repetition containing the multiplexed UCI.

Another example includes an apparatus for wireless communication including: means for determining, by a UE of a wireless communication system, that a PUCCH transmission of the UE carrying UCI will collide upon transmission with a particular PUSCH transmission of the UE; and means for multiplexing, in response to the determining, the UCI on the particular PUSCH transmission based on the beam of the PUCCH transmission and the beam of the particular PUSCH transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
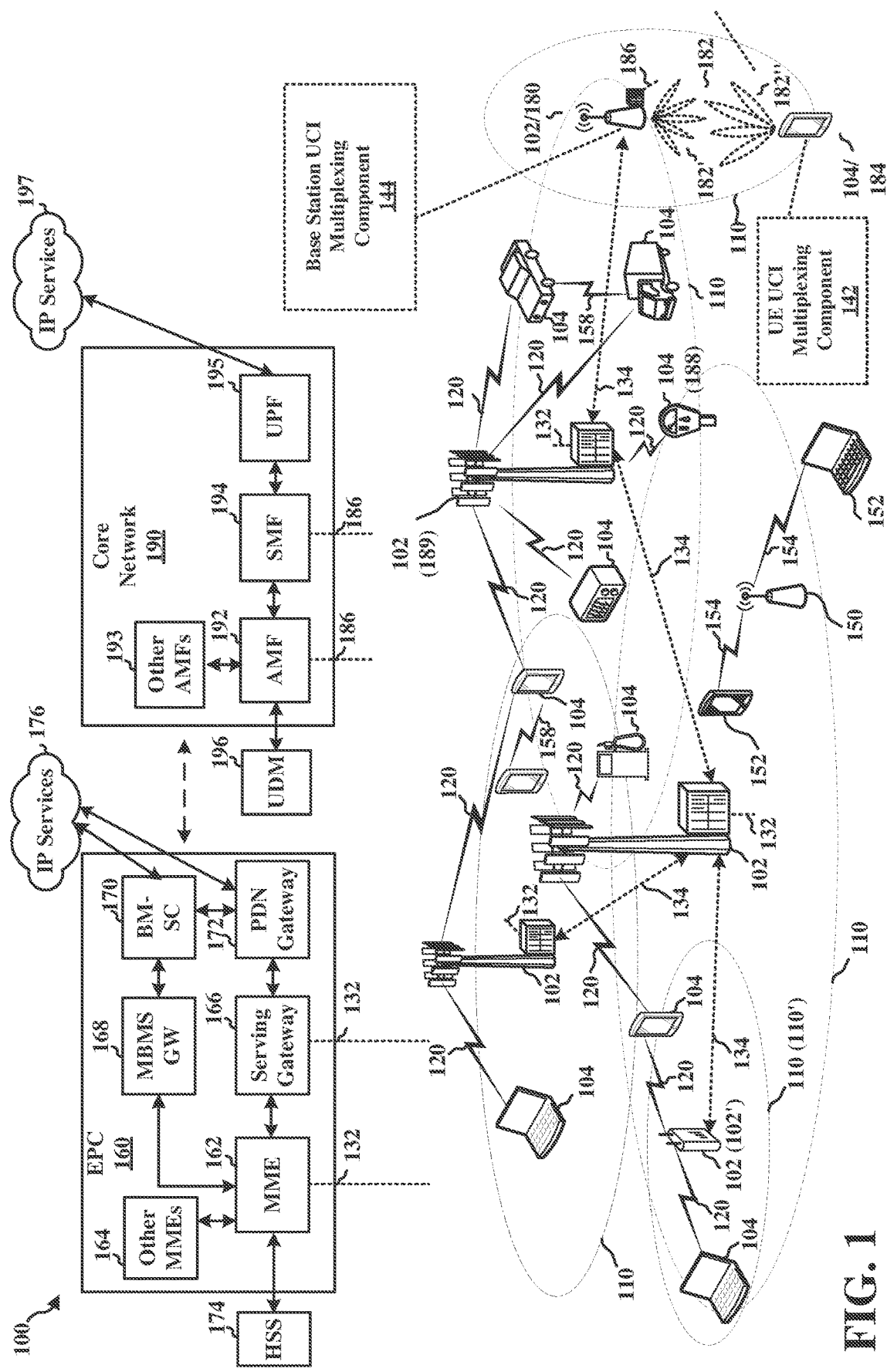
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Each evolving 3GPP standard is structured as a "Release." One standard for NR is Release (Rel.) 15 from Q2 2018. In Rel. 15, rules are defined to resolve potential collisions between transmissions of different uplink channels from a UE and still transmit uplink control information (UCI) intended for one or more of the transmissions. A potential collision can be between 1) different physical uplink control channel (PUCCH) transmissions carrying various types of UCI, or 2) a PUCCH transmission carrying UCI and a physical shared channel (PUSCH) transmission (typically containing user data). For example, for potential collisions between PUCCH transmissions are resolved based on the type of UCI to be carried in each transmission. As another example, when one of the colliding transmissions is a PUSCH transmission and the other is a PUCCH transmission with UCI, the UCI intended for the PUCCH transmission is multiplexed onto the PUSCH transmission, and the PUCCH is not transmitted. In the PUCCH/PUSCH circumstance, the UCI is transmitted on the beam used for PUSCH, regardless of the beam that would have been used for PUCCH transmission of the UCI.

However, future evolutions of 3GPP standard may include various sorts of beam diversity or redundancy, e.g., to enhance reliability and increase capacity. Under such circumstances, new technology to account for beam diversity and redundancy can be advantageous.

In aspects of the present disclosure, methods, non-transitory computer readable media, and apparatuses are provided to determine, by a UE of a wireless communication system, that a PUCCH transmission of the UE carrying UCI will collide upon transmission with a PUSCH transmission of the UE. The UE then multiplexes, in response to the determining, the UCI on the PUSCH transmission based on one or more of the beam of the PUCCH transmission and the beam of the particular PUSCH transmission.

In some examples of the technology disclosed herein, the UE is operative to transmit both PUCCH and PUSCH in repeated transmissions across a plurality of beams. In such examples, the UE receives downlink control information (DCI) specifying beam-dependent rules for multiplexing UCI onto specific instances of repeated PUSCH transmissions. In such examples, multiplexing includes multiplexing the UCI onto a specific instance of the repeated PUSCH transmission based on the beam-dependent rules. In some such examples, the beam-dependent rules specify multiplexing UCI from only a PUCCH repetition that overlaps at least one PUSCH repetition.

In some examples of the technology disclosed herein, the UE is operative to transmit both PUCCH and PUSCH in repeated transmissions across a plurality of beams. In such examples, multiplexing includes multiplexing the UCI of the PUCCH transmission on a repetition of the particular PUSCH transmission having a beam in common with the PUCCH transmission. In some such examples, the repetition of the particular PUSCH transmission having a beam in common with the PUCCH transmission is the earliest instance of the particular PUSCH transmission having a beam in common with the PUCCH transmission.

In some examples of the technology disclosed herein, the UE is operative to transmit at a given time on any one of a first group of physical channels including a first PUCCH and a first PUSCH on a first beam, and to transmit at the given time on any one of a second group of physical channels including a second PUCCH and a second PUSCH on a second beam. In such examples, determining includes determining, independently for each particular beam of the first beam and the second beam, that a PUCCH transmission carrying UCI on the particular beam will collide upon transmission with a PUSCH transmission of the UE on the particular beam. In such examples, multiplexing includes multiplexing, independently for each particular beam in response to the corresponding determining, the UCI of the PUCCH of the particular beam on the PUSCH for the particular beam.

In some such examples, the first PUSCH and the second PUSCH are not set for transmission fully overlapping in time. In such examples, after multiplexing, the UE can either (one of): drop transmission of one of the first PUSCH and the second PUSCH based on a priority, the priority based on one of a content of each PUSCH and a group identifier of each PUSCH; align the first PUSCH and the second PUSCH and transmitting both the first PUSCH and the second PUSCH; or multiplex the UCI of the first PUCCH and the UCI of the second PUCCH onto one of the first PUSCH or the second PUSCH, and transmitting the PUSCH carrying the multiplexed UCIs, under the condition that neither PUSCH includes either uplink shared channel data or channel state information. In some such examples, aligning includes one of: aligning based on the earlies first symbol and the last latest symbol of transmission across the first beam and the second beam; and aligning based on the latest first symbol and the earliest last symbol.

In some examples, the technology operates in a wireless communication system including a UE operative to transmit both PUCCH and PUSCH in repeated transmissions across a plurality of beams to a base station of the system. In such examples, the base station specifies, in downlink control information (DCI) to the UE, beam-dependent rules for multiplexing UCI of a PUCCH transmission repetition onto a PUSCH transmission repetition upon the UE determining that a PUCCH transmission repetition carrying the UCI will collide upon transmission with a PUSCH transmission repetition. In such examples, the base station receives, after the specifying, the PUSCH transmission repetition containing the multiplexed UCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH), described further infra, on the DL and can carry multiple copies of a Physical Uplink Control Channel (PUCCH), also described further infra, on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range—making mmW transmissions susceptible to blocking and attenuation resulting in, e.g., unsuccessfully decoded data. The mmW base station 180 may utilize beamforming 182 with the UE 104/184 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). In particular, some devices 188, such a utility meters, parking meters, appliances, remote sensors, etc. can be characterized by infrequent and small data packet communications—especially in relation to smart phones. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in certain aspects, the UE 104 (such as UE 184) is configured to determine that a PUCCH transmission of the UE carrying UCI will collide upon transmission with a particular PUSCH transmission of the UE. The UE then multiplexes, in response to the determining, the UCI on the particular PUSCH transmission based on the beam of the PUCCH transmission and the beam of the particular PUSCH transmission. The UE 104 can use UE UCI Multiplexing Component 142 for performing this determining and multiplexing.

In similar aspects, where the technology operates in a wireless communication system including a UE operative to transmit both PUCCH and PUSCH in repeated transmissions across a plurality of beams to a base station of the system, the base station specifies, in downlink control information (DCI) to the UE, beam-dependent rules for multiplexing UCI of a PUCCH transmission repetition onto a PUSCH transmission repetition upon the UE determining that a PUCCH transmission repetition carrying the UCI will collide upon transmission with a PUSCH transmission repetition. In such examples, the base station receives, after the specifying, the PUSCH transmission repetition containing the multiplexed UCI. The base station can use base station UCI Multiplexing Component 144 for performing the functions described in this paragraph.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
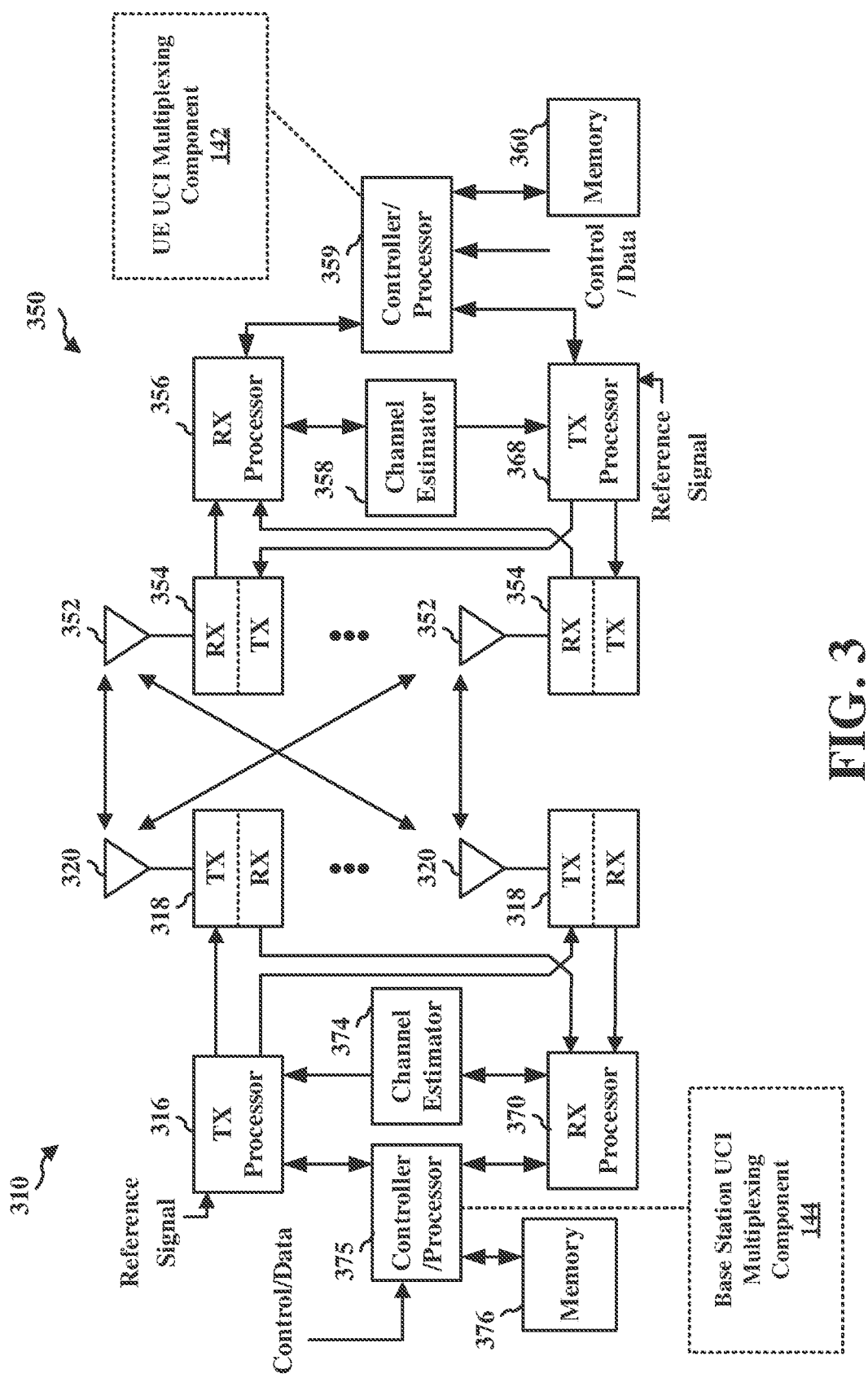
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Continuing to refer to FIG. 3, and continuing to refer to prior figures for context, in certain aspects, the UE 350 is configured to determine that a PUCCH transmission of the UE 350 carrying UCI will collide upon transmission with a particular PUSCH transmission of the UE 350. The UE 350 then multiplexes, in response to the determining, the UCI on the particular PUSCH transmission based on the beam of the PUCCH transmission and the beam of the particular PUSCH transmission. The UE 350 can use UE UCI Multiplexing Component 142 for performing this determining and multiplexing.

In similar aspects, where the technology operates in a wireless communication system including a UE 350 operative to transmit both PUCCH and PUSCH in repeated transmissions across a plurality of beams to a base station of the system, the base station 310 specifies, in downlink control information (DCI) to the UE 350, beam-dependent rules for multiplexing UCI of a PUCCH transmission repetition onto a PUSCH transmission repetition upon the UE 350 determining that a PUCCH transmission repetition carrying the UCI will collide upon transmission with a PUSCH transmission repetition. In such examples, the base station 310 receives, after the specifying, the PUSCH transmission repetition containing the multiplexed UCI. The base station 310 can use base station UCI Multiplexing Component 144 for performing the functions described in this paragraph.

Figure 4:
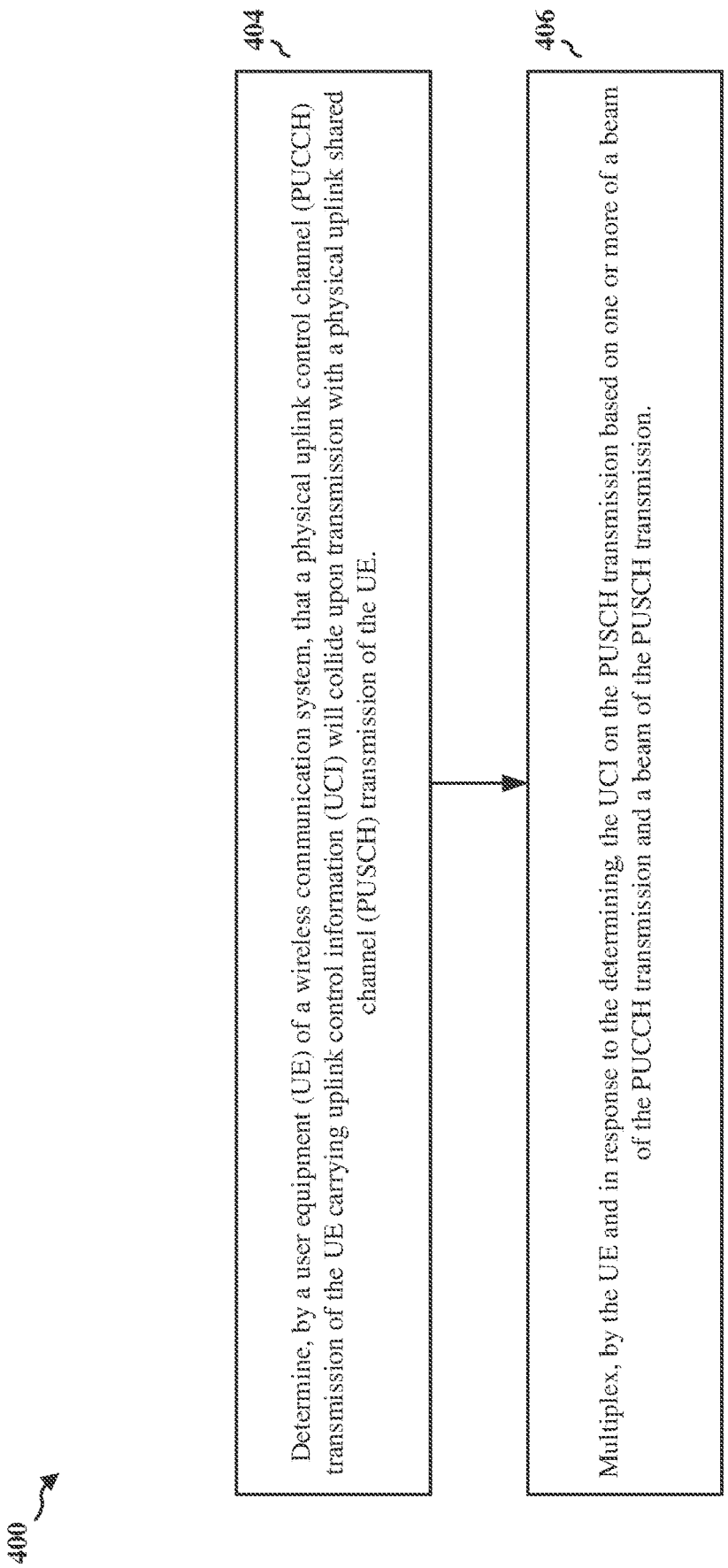
FIG. 4 is a flowchart of methods of wireless communication in accordance with examples of the technology disclosed herein.

Referring to FIG. 4, and continuing to refer to prior figures for context, a flowchart of methods 400 of wireless communication is shown, in accordance with examples of the technology disclosed herein. In such methods 400, a UE of a wireless communication system, determines that a physical uplink control channel (PUCCH) transmission of the UE carrying uplink control information (UCI) will collide upon transmission with a physical uplink shared channel (PUSCH) transmission of the UE—Block 404.

Figure 13:
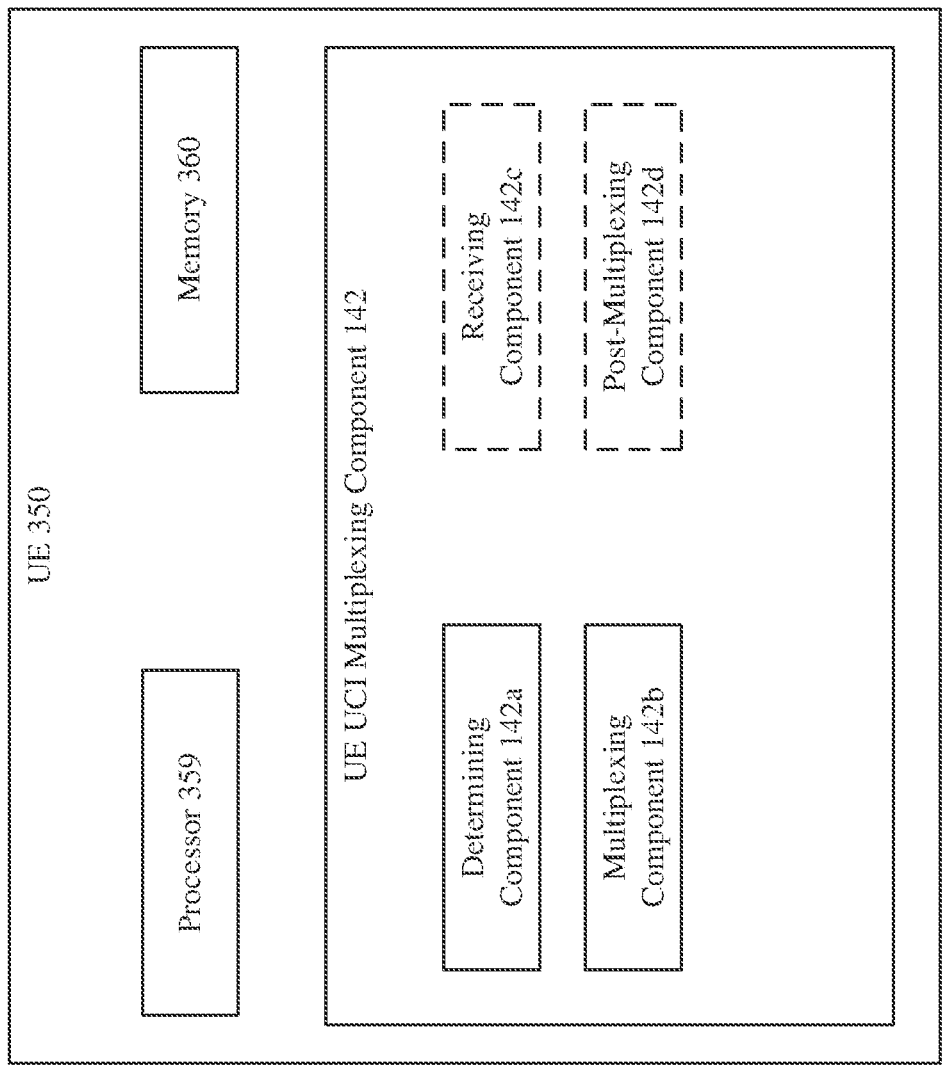
FIG. 13 is a block diagram of a user equipment, in accordance with examples of the technology disclosed herein.

Referring to FIG. 13, and continuing to refer to prior figures for context, a UE 350 for wireless communication is shown, in accordance with examples of the technology disclosed herein. UE 350 includes, in addition to a processor 359 an memory 360, a UE UCI multiplexing component 142 as described in conjunction with FIG. 3 above. UE UCI multiplexing component 142 includes determining component 142a. In some examples, the determining component 142a determines that a PUCCH transmission of the UE 350 carrying UCI will collide upon transmission with a PUSCH transmission of the UE 350. Accordingly, the determining component 142a may provide means for determining that a PUCCH transmission of the UE 350 carrying UCI will collide upon transmission with a PUSCH transmission of the UE 350.

The UE, in response to the determining, multiplexes the UCI on the PUSCH transmission based on one or more of a beam of the PUCCH transmission and a beam of the particular PUSCH transmission.—Block 406. Referring again to FIG. 13, and continuing to refer to prior figures for context, UE UCI multiplexing component 142 includes multiplexing component 142b. In some examples, the multiplexing component 142b multiplexes the UCI on the PUSCH transmission based on one or more of the beam of the PUCCH transmission and the beam of the PUSCH transmission. Accordingly, the multiplexing component 142b may provide means for multiplexing the UCI on the PUSCH transmission based on one or more of the beam of the PUCCH transmission and the beam of the PUSCH transmission.

Figure 5:
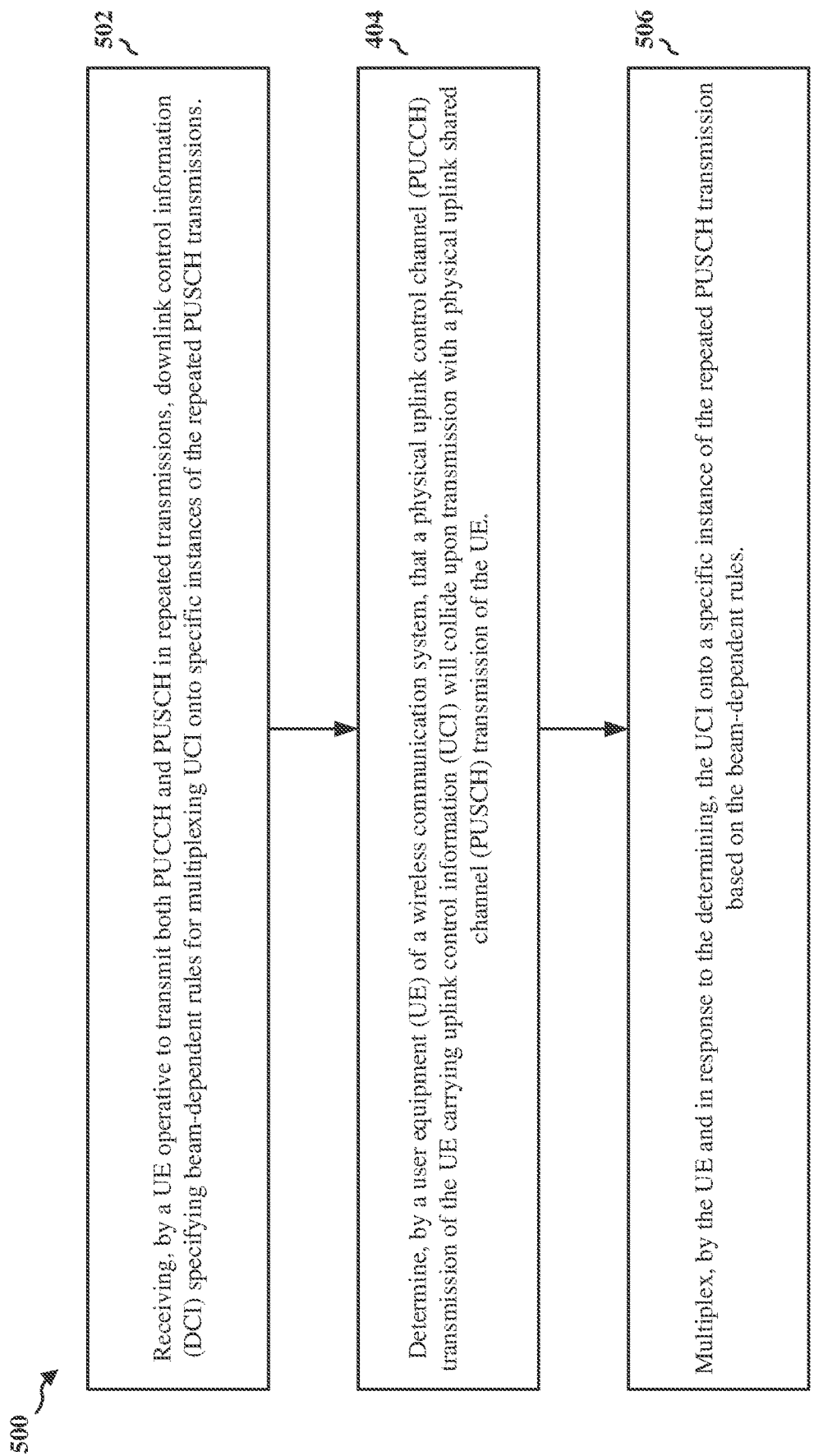
FIG. 5 is a flowchart of methods of wireless communication in accordance with examples of the technology disclosed herein.

Referring to FIG. 5, and continuing to refer to prior figures for context, a flowchart of methods 500 of wireless communication is shown, in accordance with examples of the technology disclosed herein. In such methods 500, Block 404 is performed as described above. In such methods 500, the UE is operative to transmit both PUCCH and PUSCH in repeated transmissions, and receives downlink control information (DCI) specifying beam-dependent rules for multiplexing UCI onto specific instances of the repeated PUSCH transmission—Block 502.

Figure 6:
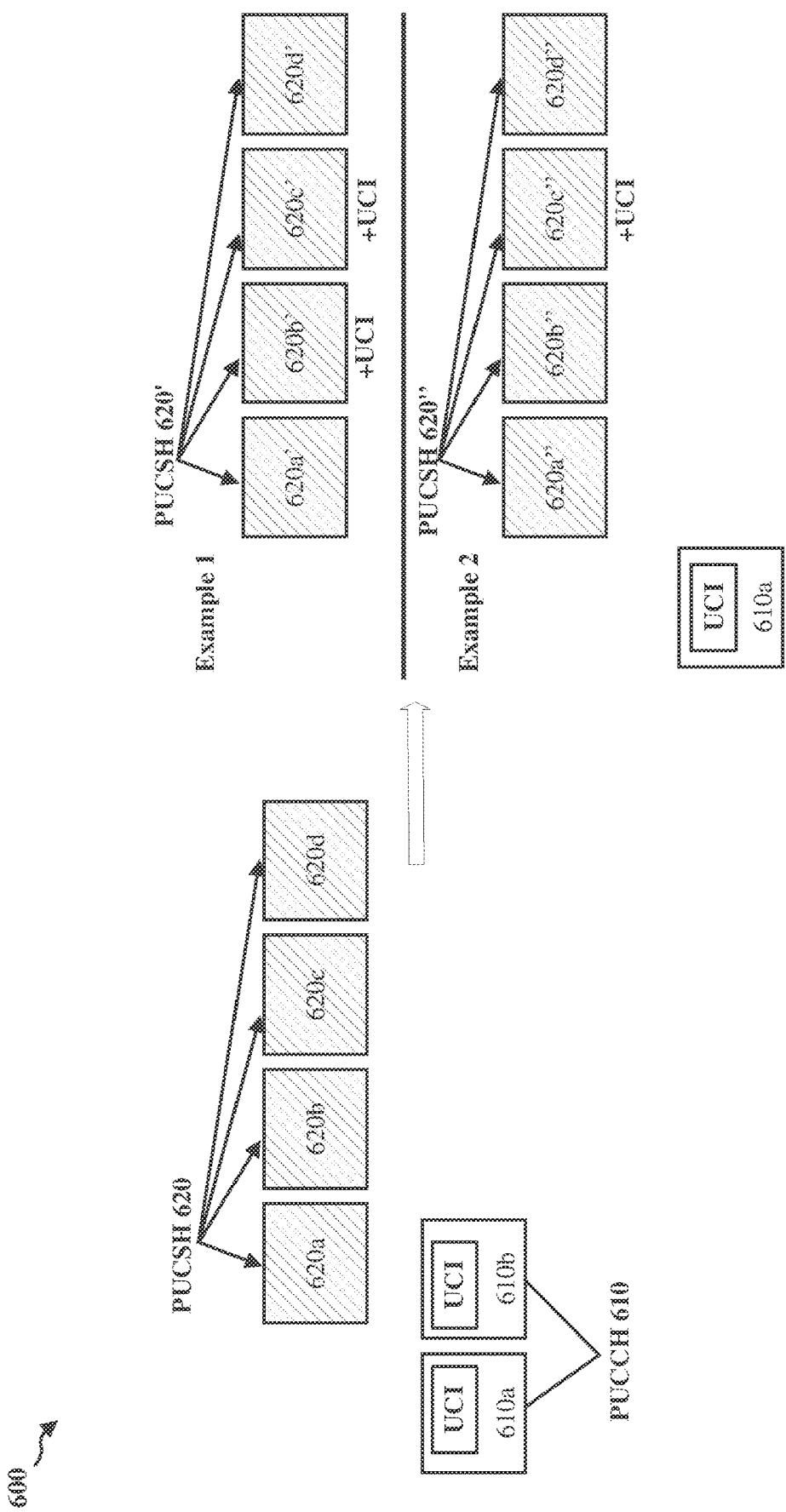
FIG. 6 is a representation potential collision between uplink channels and two example multiplexing solutions, in accordance with examples of the technology disclosed herein.

Referring to FIG. 6, and continuing to refer to prior figures for context, a representation 600 of potential collision between one of two PUCCH repetitions containing UCI 610a-610b and one set of four PUSCH repetitions 620a-620d (left side) and two example multiplexing solutions to avoid the collision (right side) is show, in accordance with examples of the technology disclosed herein. The UE 184 is operative to transmit repetitions of uplink physical channels, e.g., as a way to increase reliability. The UE 184 receives DCI specifying, e.g., via a bitmap, that in the event of a potential collision, the UCI of a first PUCCH repetition is to be multiplexed onto the second repetition of the potentially colliding PUSCH transmission, and UCI of a second PUCCH repetition is to be multiplexed onto the third repetition of the potentially colliding PUSCH transmission. In the example of FIG. 6, transmission of PUCCH repetition 610b would overlap with transmission of PUSCH repetition 620a in time (the horizontal dimension of FIG. 6), while PUCCH repetition 610a would not overlap in time with any PUSCH repetition 620.

Referring again to FIG. 13, and continuing to refer to prior figures for context, UE UCI multiplexing component 142 includes receiving component 142c. In some examples, the receiving component 142c receives downlink control information (DCI) specifying beam-dependent rules for multiplexing UCI onto specific instances of the repeated PUSCH transmission. Accordingly, the receiving component 142c may provide means for receiving downlink control information (DCI) specifying beam-dependent rules for multiplexing UCI onto specific instances of the repeated PUSCH transmission.

Similar to Block 406, the UE 184 multiplexes the UCI onto a specific instance of the repeated PUSCH transmission based on the beam-dependent rules—Block 506. In Example 1 of FIG. 6, the UE multiplexes UCI from the first PUCCH repetition onto the second PUSCH repetition 620b' and multiplexes the copy of the UCI from the second PUCCH repetition 610b (which would be overlapping in time with PUSCH repetition 620a) onto PUSCH repetition 620c'.

Referring again to FIG. 13, and continuing to refer to prior figures for context, UE UCI multiplexing component 142 includes multiplexing component 142b. In some examples, the multiplexing component 142b multiplexes the UCI onto a specific instance of the repeated PUSCH transmission based on the beam-dependent rules. Accordingly, the multiplexing component 142b may provide means for multiplexing the UCI onto a specific instance of the repeated PUSCH transmission based on the beam-dependent rules.

Referring again to FIG. 6, in Example 2, the beam-dependent rules contained in DCI received by the UE 184 specify multiplexing UCI from only a PUCCH transmission that overlaps at least one PUSCH transmission. Therefore, PUCCH transmission repetition 610a containing UCI is transmitted by the UE 184, while the UCI that would have been carried by PUCCH 610b is multiplexed onto the third repetition of PUSCH 620", i.e., PUSCH transmission repetition 620c".

Figure 7:
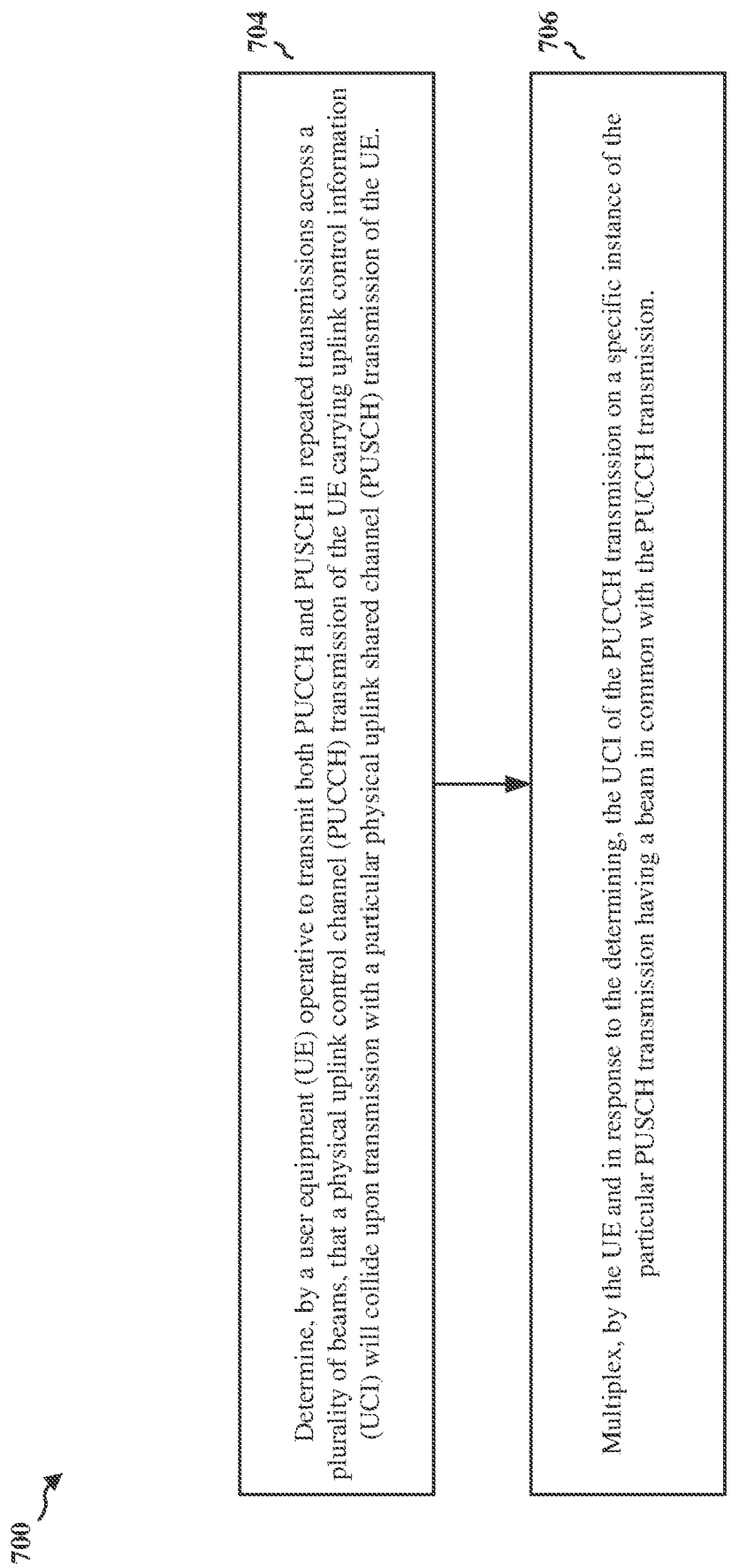
FIG. 7 is a flowchart of methods of wireless communication in accordance with examples of the technology disclosed herein.

Referring to FIG. 7, and continuing to refer to prior figures for context, a flowchart of methods 700 of wireless communication is shown, in accordance with examples of the technology disclosed herein. In such methods 700, the UE 184 is operative to transmit both PUCCH and PUSCH in repeated transmissions across a plurality of beams, and determines that a physical uplink control channel (PUCCH) transmission of the UE carrying uplink control information (UCI) will collide upon transmission with a particular physical uplink shared channel (PUSCH) transmission of the UE—Block 704.

Figure 8:
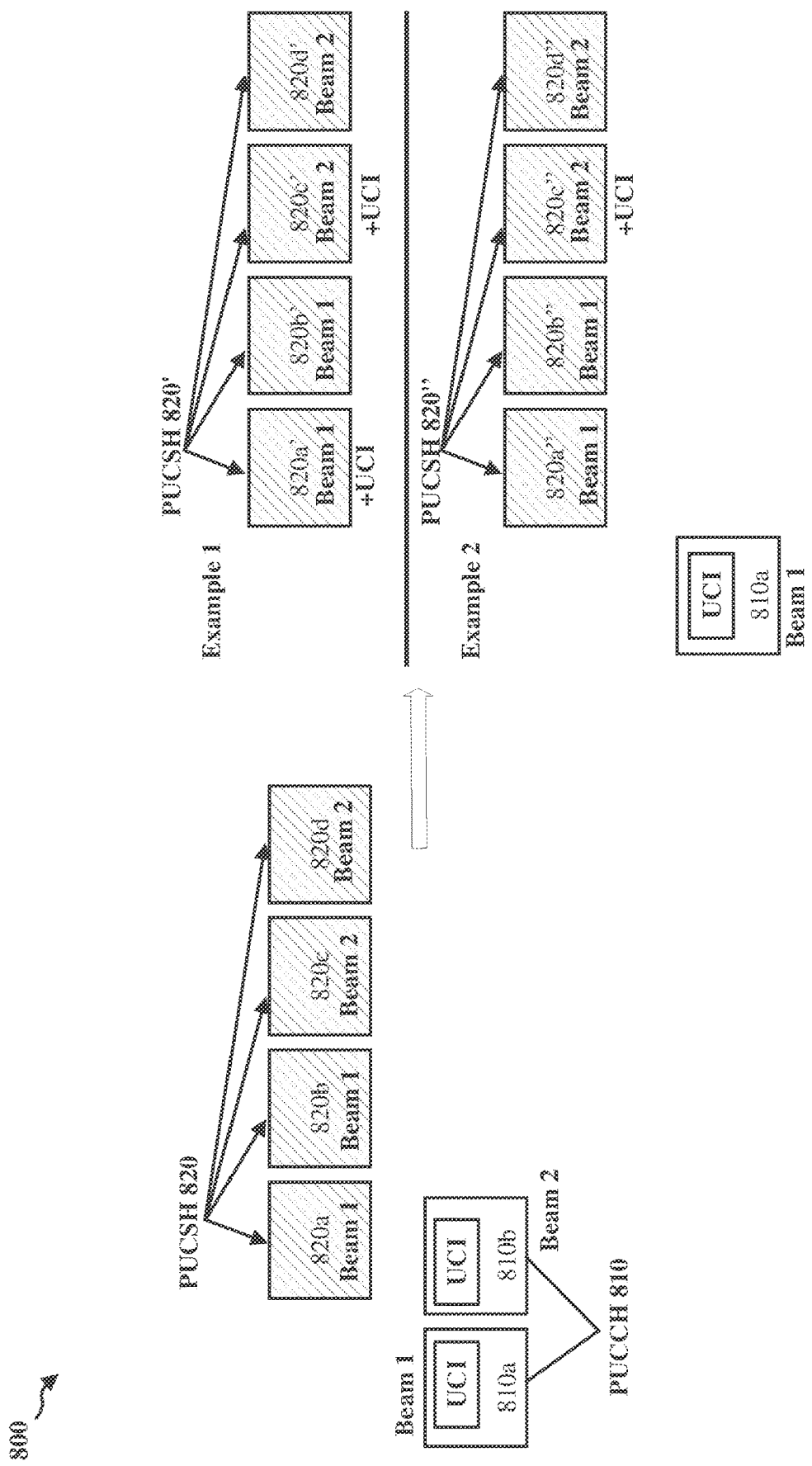
FIG. 8 is a representation of potential collision between uplink channels and two example multiplexing solutions, in accordance with examples of the technology disclosed herein.

Referring to FIG. 8, and continuing to refer to prior figures for context, a representation 800 of potential collision between one of two PUCCH repetitions containing UCI 810a-810b across Beam 1 and Beam 2 and one set of four PUSCH repetitions 820a-820d also across Beam 1 and Beam 2 the (left side) and two example multiplexing solutions to avoid the collision (right side) is show, in accordance with examples of the technology disclosed herein. The UE 184 is operative to transmit repetitions of uplink physical channels across different beams, e.g., as a way to increase reliability. In the example of FIG. 8, transmission of PUCCH repetition 810b on Beam 2 would collide with transmission of PUSCH repetition 820a in time (the horizontal dimension of FIG. 8) on Beam 1, while PUCCH repetition 810a would not overlap in time with any PUSCH repetition 820 regardless of beam.

Referring to FIG. 13, and continuing to refer to prior figures for context, UE UCI multiplexing component 142 includes determining component 142a. In some examples, the determining component 142*a* determines that a PUCCH transmission of the UE 350 carrying UCI will collide upon transmission with a PUSCH transmission of the UE 350. Accordingly, the determining component 142*a* may provide means for determining that a PUCCH transmission of the UE 350 carrying UCI will collide upon transmission with a PUSCH transmission of the UE 350.

Referring again to FIG. 7, the UE 184 multiplexes the UCI of the PUCCH transmission on a specific instance of the particular PUSCH transmission having a beam in common with the PUCCH transmission—Block 706. In FIG. 8 Example 1 the UE 184 multiplexes the UCI from the Beam 1 transmission of PUCCH 810*a* onto the first Beam 1 transmission of PUSCH 820' and multiplexes the copy of the UCI from the Beam 2 transmission of PUCCH 810*b* onto the earliest Beam 2 transmission of PUSCH 820*c'*. In FIG. 8 Example 2, UE 184 multiplexes UCI from only a PUCCH transmission that overlaps at least one PUSCH transmission. Therefore, PUCCH transmission repetition 810*a* containing UCI is transmitted by the UE 184, while the UCI that would have been carried by PUCCH 810*b* is multiplexed onto the third repetition of PUSCH 820", i.e., PUSCH transmission repetition 820*c"*.

Referring again to FIG. 13, and continuing to refer to prior figures for context, UE UCI multiplexing component 142 includes multiplexing component 142*b*. In some examples, the multiplexing component 142*b* multiplexes the UCI of the PUCCH transmission on a specific instance of the particular PUSCH transmission having a beam in common with the PUCCH transmission. Accordingly, the multiplexing component 142*b* may provide means for multiplexing the UCI of the PUCCH transmission on a specific instance of the particular PUSCH transmission having a beam in common with the PUCCH transmission.

When a UE is configured with concurrent uplink transmission on different uplink beams (conditioned on the UE indicating such capability signaling, e.g., for multipanel UEs), the uplink channels can be divided into groups based on the intended beam. The beam group ID can represent an implicit UE panel ID, or a TRP ID/CORESETPoolIndex (in the case of multi-TRP operation). Each uplink channel is associated with one of the groups. UCI can then be multiplexed separately and independently per beam. This can include multiplexing different PUCCHs that re time overlapping on the same beam, and multiplexing UCI in PUSCH when corresponding PUCCH overlaps in time with the PUSCH on the same beam. The UE transmits the resulting PUCCHs and PUSCHs in the first group and concurrently transmits the resulting PUCCHs and PUSCHs in the second group.

Figure 9:
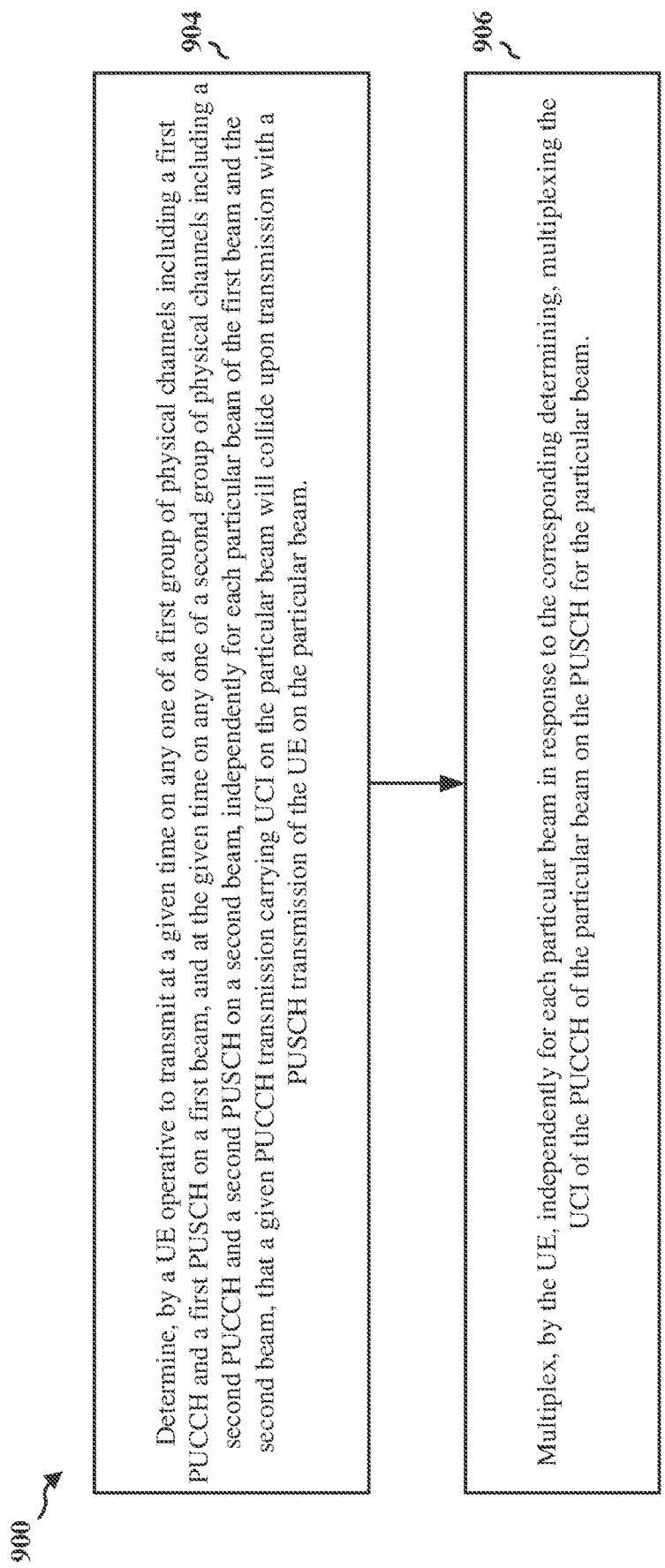
FIG. 9 is a flowchart of methods of wireless communication in accordance with examples of the technology disclosed herein.

Referring to FIG. 9, and continuing to refer to prior figures for context, a flowchart of methods 900 of wireless communication is shown, in accordance with examples of the technology disclosed herein. In such methods 900, the UE is operative to transmit at a given time on any one of a first group of physical channels including a first PUCCH and a first PUSCH on a first beam, and at the given time on any one of a second group of physical channels including a second PUCCH and a second PUSCH on a second beam. In such methods, the UE determines, independently for each particular beam of the first beam and the second beam, that a given PUCCH transmission carrying UCI on the particular beam will collide upon transmission with a PUSCH transmission of the UE on the particular beam—Block 904.

Figure 10:
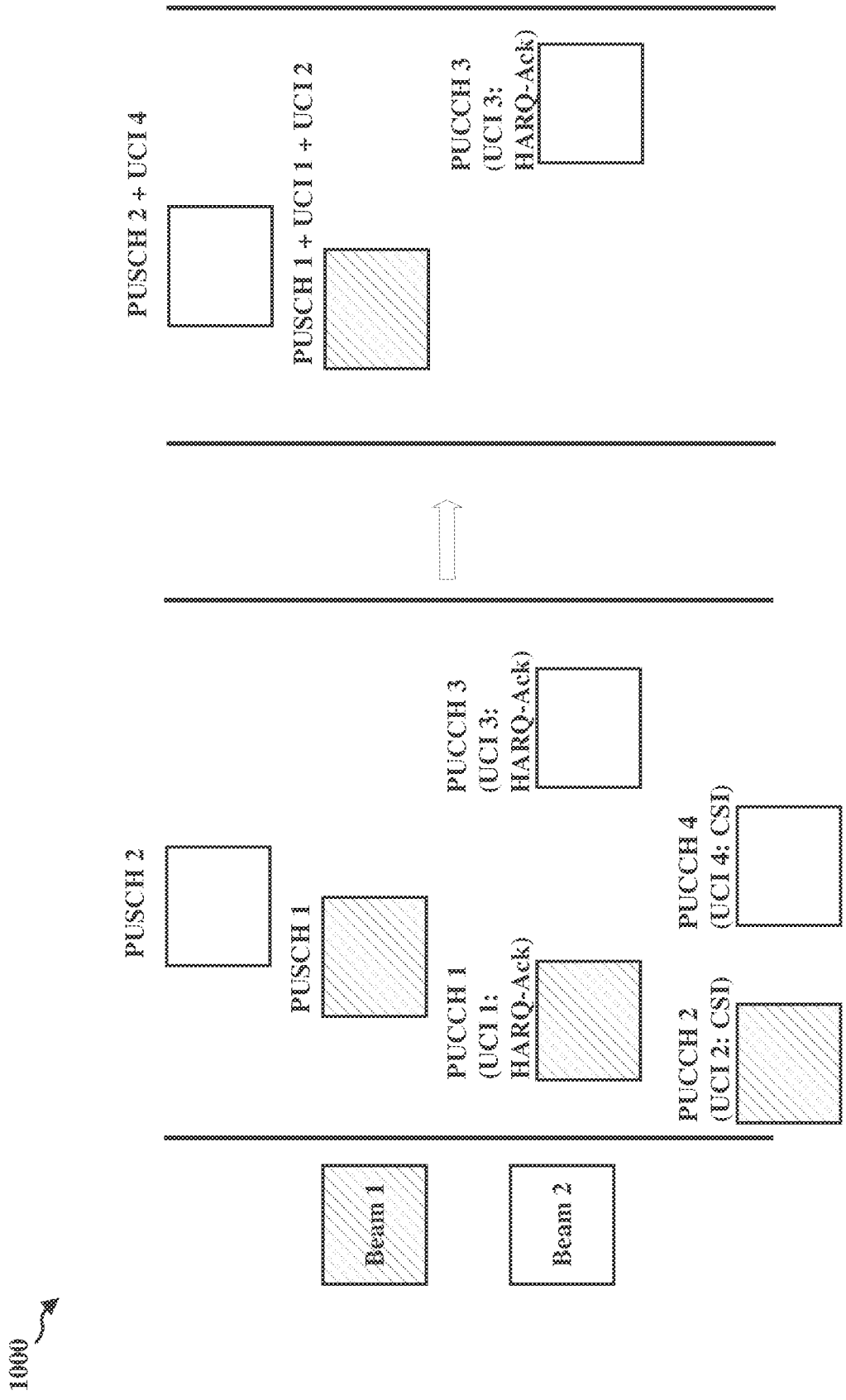
FIG. 10 is a representation of a collision scenario and a multiplexing solution, in accordance with examples of the technology disclosed herein.

Referring to FIG. 10, and continuing to refer to prior figures for context, a representation 1000 of a collision scenario (left side) and a multiplexing solution (right side) is shown, in accordance with an example of the technology disclosed herein. The UE 184 is operative to transmit at a given time on any one of a first group of physical channels including PUCCH 1 (carrying UCI1:HARQ-ACK), PUCCH 2 (carrying UCI2:CSI) and a PUSCH 1 on Beam 1, and concurrently on any one of a second group of physical channels including a PUCCH 3 (carrying UCI3:HARQ-ACK), PUCCH 4 (carrying UCI4:CSI) and PUSCH 2 on a Beam 2. Note that the first numeric designator after the physical channel name in FIG. 10 does not refer to beam number, but refers to a channel group, e.g., as in relation to carrier aggregation. The UE 184 is operative to transmit concurrently and independently on separate beams, e.g., as a way to increase both capacity and reliability. For Beam 1, the UE 184 independently determines that PUCCH 1 and PUCCH 2 (both carrying UCI) would not only collide with each other, but also with PUSCH 1. For Beam 2, the UE 184 independently determines that PUCCH 4 (carrying UCI) would collide with PUSCH 2 and that PUCCH 3 (carrying UCI) would not collide with PUSCH 2.

Referring to FIG. 13, and continuing to refer to prior figures for context, UE UCI multiplexing component 142 includes determining component 142*a*. In some examples, the determining component 142*a* determines, independently for each particular beam of the first beam and the second beam, that a given PUCCH transmission carrying UCI on the particular beam will collide upon transmission with a PUSCH transmission of the UE 350 on the particular beam. Accordingly, the determining component 142*a* may provide means for determines, independently for each particular beam of the first beam and the second beam, that a given PUCCH transmission carrying UCI on the particular beam will collide upon transmission with a PUSCH transmission of the UE 350 on the particular beam.

Referring again to FIG. 9, the UE multiplexes, independently for each particular beam in response to the corresponding determining, the UCI of the PUCCH of the particular beam on the PUSCH transmission for the particular beam—Block 906. In the example of FIG. 10, for Beam 1, the UE 184 multiplexes the UCI of both PUCCH 1 and PUCCH 2 onto PUSCH 1, so that PUSCH 1 carries UCI1: HARQ-ACK and UCI2:CSI. The UE 184, independently for Beam 2, multiplexes the UCI of PUCCH 4 onto PUSCH 2, so that PUSCH 2 carries UCI 4. Since PUCCH 3 on Beam 1 will not collide with PUSCH 2 on Beam 1, the UE does not multiplex the UCI carried by PUCCH 3 and merely transmits PUCCH 3. In some examples, the UE 184 can receive DCI specifying, e.g., via a bitmap, details of how UCI is to be multiplexed onto the PUSCH transmissions in the event of an expected collision, independently for each concurrent beam in a fashion similar to that described above in relation to FIG. 5.

Referring again to FIG. 13, and continuing to refer to prior figures for context, UE UCI multiplexing component 142 includes multiplexing component 142*b*. In some examples, the multiplexing component 142*b* multiplexes the UCI on the PUSCH transmission based on one or more of the beam of the PUCCH transmission and the beam of the PUSCH transmission. Accordingly, the multiplexing component 142*b* may provide means for multiplexing the UCI on the PUSCH transmission based on one or more of the beam of the PUCCH transmission and the beam of the PUSCH transmission.

Concurrent transmission across multiple beams from a UE may be conditioned on the two uplink channels to be transmitted on the same OFDM symbols—a partial overlap in time may be harder to support compared to a full overlap in time, e.g., due to RF limitations and power control factors. In this case, if two uplink channels that belong to different beams and are to be transmitted (after per beam multiplexing, but before transmission, are not completely overlapping in time (on the same or different resource blocks) one of at least three approaches can be used.

Figure 11:
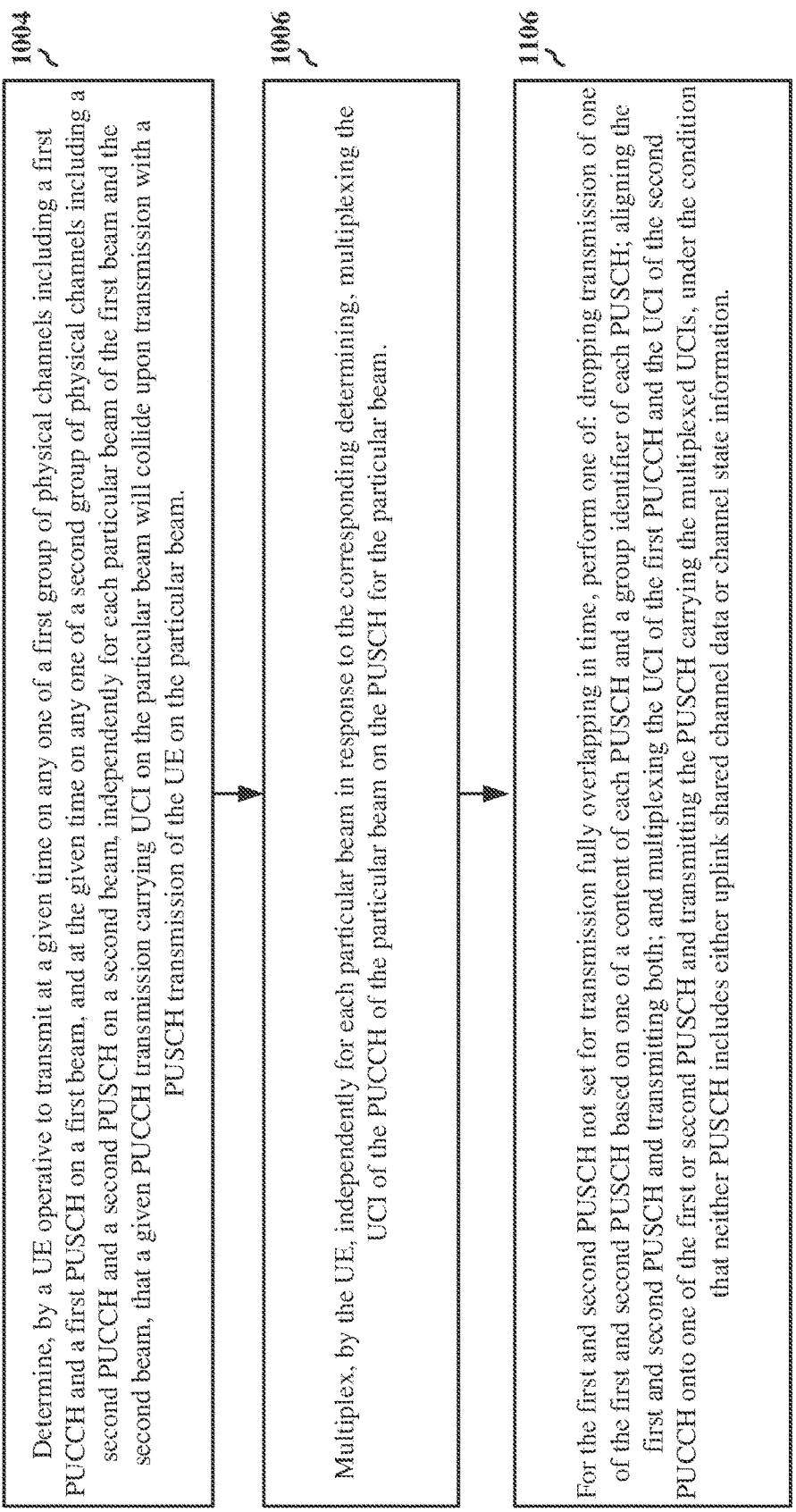
FIG. 11 is a flowchart of methods of wireless communication in accordance with examples of the technology disclosed herein.

Referring to FIG. 11, and continuing to refer to prior figures for context, a flowchart of methods 1100 of wireless communication is shown, in accordance with examples of the technology disclosed herein. In such methods 1100, after determining and multiplexing as described in conjunction with FIG. 10, for the first and second PUSCH not set for transmission fully overlapping in time, the UE performs one of: dropping transmission of one of the first and second PUSCH based on one of a content of each PUSCH and a group identifier of each PUSCH; aligning the first and second PUSCH and transmitting both; and multiplexing the UCI of the first PUCCH and the UCI of the second PUCCH onto one of the first or second PUSCH and transmitting the PUSCH carrying the multiplexed UCIs, under the condition that neither PUSCH includes either uplink shared channel data or channel state information—Block 1106.

In a first approach, one of the PUSCH transmissions can be dropped and the other transmitted based on uplink physical channel priority. The priority can be based on the content of the channel, e.g., UL-SCH, then HARQ-ACK, then SR, then CSI. The priority can be based on the channel group ID associated with the particular beam, e.g., a UE panel ID, a TRP ID/CORESETPoolIndex in the case of multi-TRP operation.

Figure 12:
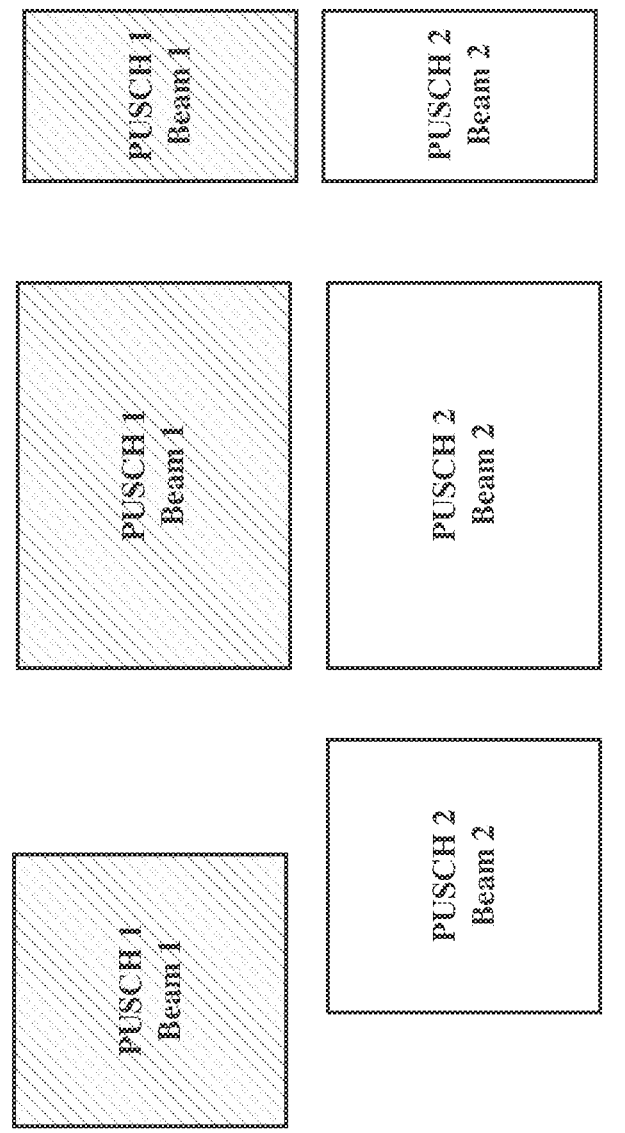
FIG. 12 is a diagram illustrating misalignment and alternatives for a second approach at post-multiplexing processing of a core network, in accordance with examples of the technology disclosed herein.

Referring to FIG. 12, and continuing to refer to prior figures for context, misalignment (per FIG. 10) and alternatives for a second approach at post-multiplexing processing are shown. In the second approach, the durations of PUSCH on each beam can be aligned in time. In a first alternative of the second approach, alignment can be based on the earliest first symbol and the latest last symbol. In this case, durations for one or both uplink channels are increased and the UE 184 performs rate matching. In a second alternative of the second approach, alignment can be based on the latest first symbol and the earliest last symbol. In this second alternative, the duration for one or both uplink channels is reduced and the UE 184 can perform either rate matching or puncturing, as appropriate.

In another approach, if both beams do not carry channels that include UL-SCH and both beams do not include CSI, then the channel of one beam can be multiplexed on the other and only the multiplexed beam transmitted.

Referring again to FIG. 13, and continuing to refer to prior figures for context, UE UCI multiplexing component 142 includes post-multiplexing component 142d. In some examples, the post-multiplexing component 142d performs one of: dropping transmission of one of the first and second PUSCH based on one of a content of each PUSCH and a group identifier of each PUSCH; aligning the first and second PUSCH and transmitting both; and multiplexing the UCI of the first PUCCH and the UCI of the second PUCCH onto one of the first or second PUSCH and transmitting the PUSCH carrying the multiplexed UCIs. Accordingly, the multiplexing component 142b may provide means for performing one of: dropping transmission of one of the first and second PUSCH based on one of a content of each PUSCH and a group identifier of each PUSCH; aligning the first and second PUSCH and transmitting both; and multiplexing the UCI of the first PUCCH and the UCI of the second PUCCH onto one of the first or second PUSCH and transmitting the PUSCH carrying the multiplexed UCIs.

Figure 14:
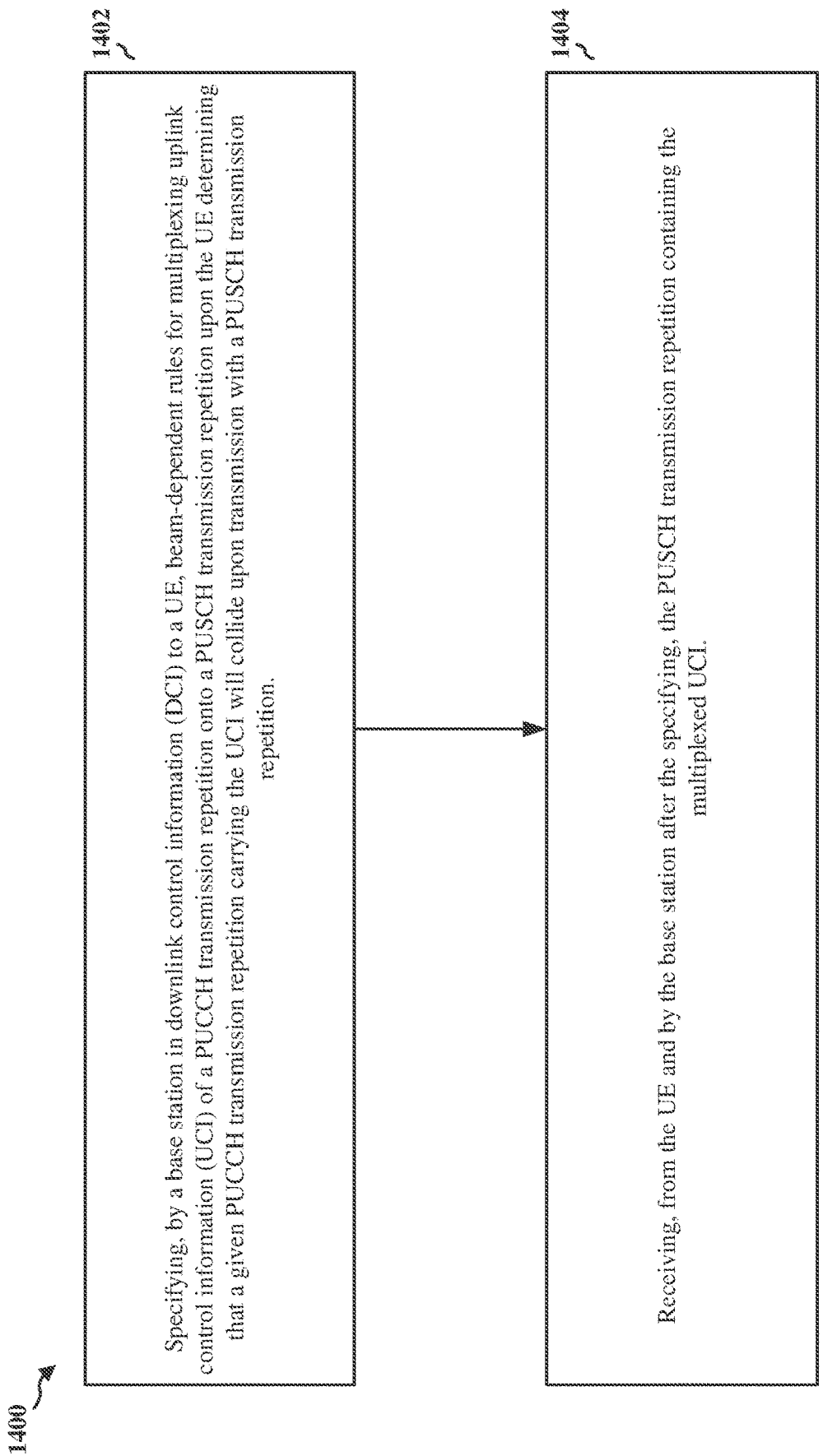
FIG. 14 is a flowchart of methods of wireless communication in accordance with examples of the technology disclosed herein.
Figure 15:
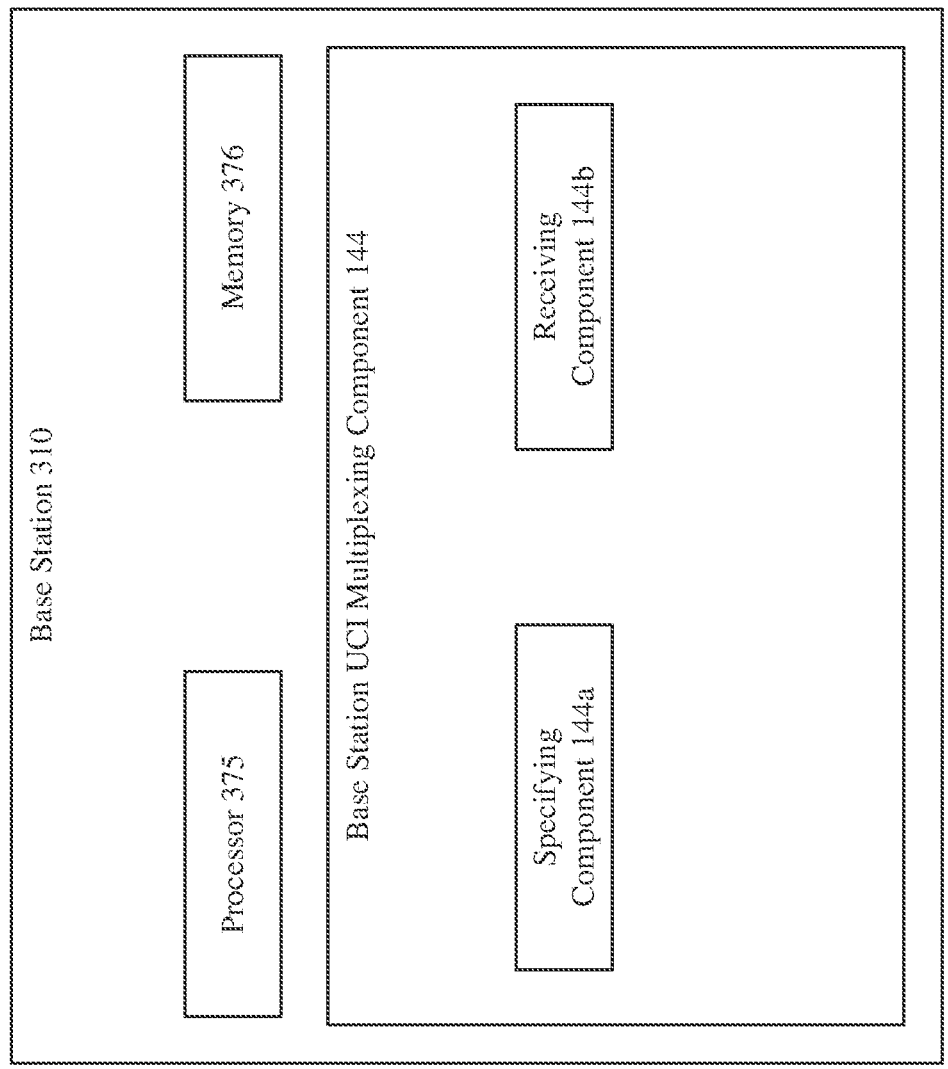
FIG. 15 is a block diagram of a base station, in accordance with examples of the technology disclosed herein.

Referring to FIG. 14, and continuing to refer to prior figures for context, a flowchart of methods 1400 of wireless communication is shown, in accordance with examples of the technology disclosed herein. In such methods 1400, a base station specifies, in DCI to a UE, beam-dependent rules for multiplexing UCI of a PUCCH transmission repetition onto a PUSCH transmission repetition upon the UE determining that a given PUCCH transmission repetition carrying the UCI will collide upon transmission with a PUSCH transmission repetition—Block 1402. Referring to FIG. 15, and continuing to refer to prior figures for context, a base station 310 for wireless communication is shown, in accordance with examples of the technology disclosed herein. Base station 310 includes, in addition to a processor 375 and memory 376, a base station UCI multiplexing component 144 as described in conjunction with FIG. 3 above. Base station UE UCI multiplexing component 144 includes specifying component 144a. In some examples, the specifying component 144a specifies, in DCI to a UE 184, beam-dependent rules for multiplexing UCI of a PUCCH transmission repetition onto a PUSCH transmission repetition. Accordingly, the specifying component 144a may specify, in DCI to a UE 184, beam-dependent rules for multiplexing UCI of a PUCCH transmission repetition onto a PUSCH transmission repetition.

The base station receives, from the UE after the specifying, the PUSCH transmission repetition containing the multiplexed UCI—Block 1404. Referring to FIG. 15, and continuing to refer to prior figures for context, base station UE UCI multiplexing component 144 includes receiving component 144b. In some examples, the receiving component 144b receives, from the UE after the specifying, the PUSCH transmission repetition containing the multiplexed UCI. Accordingly, the receiving component 144b may receive, from the UE after the specifying, the PUSCH transmission repetition containing the multiplexed UCI.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation . . . .

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication, comprising:
    determining, by a user equipment (UE), that a physical uplink control channel (PUCCH) transmission of the UE carrying uplink control information (UCI) will collide upon transmission with a physical uplink shared channel (PUSCH) transmission of the UE;
    wherein the UE is operative to transmit:
        at a given time on any one of a first group of physical channels including a first PUCCH and a first PUSCH on a first beam, and
        at the given time on any one of a second group of physical channels including a second PUCCH and a second PUSCH on a second beam; and
    wherein, independently for each particular beam of the first beam and the second beam, that a PUCCH transmission carrying UCI on the particular beam will collide upon transmission with a PUSCH transmission on the particular beam is determined; and
    multiplexing, by the UE and in response to the determining, the UCI on the PUSCH transmission based on one or more of a beam of the PUCCH transmission and a beam of the PUSCH transmission;
    wherein, independently for each particular beam in response to the corresponding determining, the UCI of the PUCCH of the particular beam is multiplexed on the PUSCH transmission for the particular beam.

2. The method of claim 1:
    wherein the UE is operative to transmit both PUCCH and PUSCH in repeated transmissions;
    the method further comprises receiving, by the UE, downlink control information (DCI) specifying beam-dependent rules for multiplexing UCI onto specific instances of the repeated PUSCH transmissions; and
    multiplexing comprises multiplexing the UCI onto a specific instance of the repeated PUSCH transmission based on the beam-dependent rules.

3. The method of claim 2, wherein:
    the beam-dependent rules specify multiplexing UCI from only a PUCCH transmission that overlaps at least one PUSCH transmission.

4. The method of claim 1:
    wherein the UE is operative to transmit both PUCCH and PUSCH in repeated transmissions across a plurality of beams; and
    multiplexing comprises multiplexing the UCI of the PUCCH transmission on a specific instance of the particular PUSCH transmission having a beam in common with the PUCCH transmission.

5. The method of claim 4, wherein the specific instance of the particular PUSCH transmission having a beam in common with the PUCCH transmission is the earliest instance of the particular PUSCH transmission having a beam in common with the PUCCH transmission.

6. The method of claim 1:
    wherein the first PUSCH and the second PUSCH are not set for transmission fully overlapping in time; and
    the method further comprises, after multiplexing, one of:
        dropping transmission of one of the first PUSCH and the second PUSCH based on a priority, the priority based on one of a content of each PUSCH and a group identifier of each PUSCH;
        aligning the first PUSCH and the second PUSCH and transmitting both the first PUSCH and the second PUSCH; and
        multiplexing the UCI of the first PUCCH and the UCI of the second PUCCH onto one of the first PUSCH or the second PUSCH, and transmitting the PUSCH carrying the multiplexed UCIs, under the condition that neither PUSCH includes either uplink shared channel data or channel state information.

7. The method of claim 6, wherein aligning comprises one of:
    aligning based on the earliest first symbol and the last latest symbol of transmission across the first beam and the second beam; and
    aligning based on the latest first symbol and the earliest last symbol of transmission across the first beam and the second beam.

8. An apparatus for wireless communication at a user equipment (UE), comprising:
    means for determining that a physical uplink control channel (PUCCH) transmission of the UE carrying uplink control information (UCI) will collide upon transmission with a physical uplink shared channel (PUSCH) transmission of the UE;
    wherein the apparatus is configured to transmit:
        at a given time on any one of a first group of physical channels including a first PUCCH and a first PUSCH on a first beam, and
        at the given time on any one of a second group of physical channels including a second PUCCH and a second PUSCH on a second beam; and
    wherein, independently for each particular beam of the first beam and the second beam, that a PUCCH transmission carrying UCI on the particular beam will collide upon transmission with a PUSCH transmission on the particular beam is determined; and
    means for multiplexing, in response to the determining, the UCI on the PUSCH transmission based on a beam of the PUCCH transmission and a beam of the PUSCH transmission;
    wherein, independently for each particular beam in response to the corresponding determining, the UCI of the PUCCH of the particular beam is multiplexed on the PUSCH transmission for the particular beam.

9. The apparatus of claim 8:
    wherein the apparatus is operative to transmit both PUCCH and PUSCH in repeated transmissions across a plurality of beams;
    the apparatus further comprises means for receiving downlink control information (DCI) specifying beam-dependent rules for multiplexing UCI onto specific instances of repeated PUSCH transmissions; and means for multiplexing comprises means for multiplexing the UCI onto a specific instance of the repeated PUSCH based on the beam-dependent rules.

10. The apparatus of claim 9, wherein:
the beam-dependent rules specify multiplexing UCI from only PUCCH repetitions that overlap at least one PUSCH repetition.

11. The apparatus of claim 8:
wherein the UE is operative to transmit both PUCCH and PUSCH in repeated transmissions across a plurality of beams; and
means for multiplexing comprises means for multiplexing the UCI of the PUCCH transmission on a specific instance of the particular PUSCH transmission having a beam in common with the PUCCH transmission.

12. The apparatus of claim 11, wherein the specific instance of the particular PUSCH transmission having a beam in common with the PUCCH transmission is the earliest instance of the particular PUSCH transmission having a beam in common with the PUCCH transmission.

13. The apparatus of claim 8:
wherein the first PUSCH and the second PUSCH are not set for transmission fully overlapping in time; and
the apparatus further comprises means for, after multiplexing, one of:
dropping transmission of one of the first PUSCH and the second PUSCH based on a priority, the priority based on one of a content of each PUSCH and a group identifier of each PUSCH;
aligning the first PUSCH and the second PUSCH and transmitting both the first PUSCH and the second PUSCH; and
multiplexing the UCI of the first PUSCH and the UCI of the second PUCCH onto one of the first PUSCH or the second PUSCH, and transmitting the PUSCH carrying the multiplexed UCIs, under the condition that neither PUSCH includes either uplink shared channel data or channel state information.

14. The apparatus of claim 13, wherein aligning comprises one of:
aligning based on the earliest first symbol and the last latest symbol of transmission across the first beam and the second beam; and
aligning based on the latest first symbol and the earliest last symbol of transmission across the first beam and the second beam.

* * * * *